United States Patent [19]
Lack et al.

[11] Patent Number: 4,790,264
[45] Date of Patent: Dec. 13, 1988

[54] ANIMAL WATERERS FOR SNAP-ON ASSEMBLY WITH WATER PIPE

[75] Inventors: Frank Lack; Francis R. Rustin, both of Springfield, Mo.

[73] Assignee: Agri Manufacturing Corporation, Springfield, Mo.

[21] Appl. No.: 64,100

[22] Filed: Jun. 17, 1987

[51] Int. Cl.[4] .............................................. A01K 7/06
[52] U.S. Cl. .................................................... 119/72.5
[58] Field of Search .................... 119/72.5, 72, 74, 75; 239/28, 29.3, 30

[56] References Cited

U.S. PATENT DOCUMENTS

| | | | |
|---|---|---|---|
| 2,710,594 | 6/1955 | Thompson | 119/72.5 |
| 3,239,192 | 3/1966 | Totten | 251/322 |
| 3,263,652 | 8/1966 | Nakajima et al. | 119/72.5 |
| 3,418,977 | 12/1968 | Godshalk | 119/72.5 |
| 3,481,310 | 12/1969 | Alburger | 119/72.5 |
| 3,582,006 | 6/1971 | Thompson | 251/146 |
| 3,724,425 | 4/1973 | Thompson | 119/72 |
| 3,941,094 | 3/1976 | Nilsen, Jr. | 119/80 |
| 4,133,345 | 1/1979 | Mitchell | 137/446 |
| 4,254,794 | 3/1981 | Smith | 137/434 |
| 4,267,800 | 5/1981 | Keller et al. | 119/72.5 |
| 4,282,831 | 8/1981 | Nilsen | 119/75 |
| 4,402,343 | 9/1983 | Thompson et al. | 137/614.2 |
| 4,527,513 | 7/1985 | Hart et al. | 119/51.5 |
| 4,610,221 | 9/1986 | Steudler, Jr. | 119/72.5 |

Primary Examiner—Robert Peshock
Attorney, Agent, or Firm—Glaser, Griggs & Schwartz

[57] ABSTRACT

A nipple waterer consists of a valve body including a base with exterior and interior bosses projecting in opposite directions from that base. A pair of spring fingers project from that base generally parallel to each other and to the interior boss. These fingers are provided with interior cylindrical recesses for engaging the cylindrical exterior of a water pipe; and the pipe is provided with a radial hole to receive the interior boss which communicates with the interior of the pipe. A bore extends axially through the two bosses and the intervening base and defines a valve chamber. A cap, secured to the exterior boss, is provided with a central hole and defines a valve seat. A valve closure member consists of a headed stem, with the stem projecting through the hole and the cap to be actuated by an animal to unseat the closure member. The closure member head is maintained against the valve seat by a helical compression spring within the valve chamber, retained therein by an internal lip at the distal end of the interior boss. In cup waterer form, a frusto-conical cup member is formed integrally with the valve body, surrounding the exterior boss and projecting closure member stem. In convertible waterer form, the above mentioned valve body base includes a larger mounting boss, from which the smaller exterior boss projects.

11 Claims, 3 Drawing Sheets

ANIMAL WATERERS FOR SNAP-ON ASSEMBLY WITH WATER PIPE

BACKGROUND OF THE INVENTION

This invention relates to waterer systems for poultry or other small animals wherein a plurality of waterers, such as nipple waterers or cup waterers, are mounted in longitudinally spaced relation along a length of water pipe. More particularly, this invention relates to such systems wherein the waterers are configured to be assembled to or disassembled from the associated water pipe without the use of tools.

Thompson et al U.S. Pat. No. 4,402,343 relates to a particular configuration of a waterer, including a valve with a spring loaded valve closure member. FIGS. 1 through 5 of this patent illustrate an animal waterer as a nipple waterer, wherein an actuator stem or nipple extends downward from the waterer to be operated by an animal allowing water to be released and trickle down the stem to the mouth of the animal. FIG. 9 of this patent illustrates a waterer as a cup waterer, wherein the actuator stem or nipple extends upward into a cup so that water enters the cup selectively when the nipple is operated by an animal.

In these configurations, the waterer is secured to the pipe by engagement of a threaded housing in a threaded hole in the pipe. Assembly of the waterers to or disassembly of the waterers from the pipe, then, requires a wrenching tool. Additionally the waterer and the pipe must be prethreaded, necessitating associated manufacturing expense.

In the prior art, there are many other known means by which nipple waterers and/or cup waterers are secured to pipe, such as PVC pipe. These means include various types of clamps, direct cementing to the pipe, attachment to saddles or other mounts which are cemented to the pipe, external spring clips, adaptors threaded to the pipe, etc. Most of these means require the fabrication of additional components; and the mounting of the waterers to the pipe or removing from the pipe requires considerable time and effort. Of course, where the waterers are directly cemented to the pipe, the removal and replacement of the valve is a particularly time consuming task.

A principal object of this invention is to provide an animal waterer which may be assembled to and disassembled from a water pipe without the use of tools.

Another object of this invention is to provide an animal waterer which enables a very rapid assembly of waterers to water pipe, thereby providing for markedly reduced installation costs of a waterer system.

A further object of this invention is to provide an animal waterer configured to be snapped onto and off from is a water pipe, thereby facilitating the removal and replacement of waterers which may malfunction.

Another object of this invention is to provide an animal waterer configured for snap-on assembly to or disassembly from an associated water pipe, the waterer having the configuration of a nipple waterer or a cup waterer.

A still further object of this invention is to provide an animal waterer designed for snap-on assembly to or disassembly from an associated water pipe, configured as a nipple waterer, and including an attachable cup member for converting the nipple waterer to a cup waterer.

These objects are accomplished broadly in an animal waterer to be mounted on a cylindrical pipe. The waterer consists of a valve body which includes a base and interior and exterior aligned bosses projecting from that base in opposite directions. The valve body has a bore extending axially through the bosses and base, defining a valve chamber; and an annular cap member secured to the exterior boss at its distal end defines a valve seat. The valve closure member includes an enlarged head which is disposed within the valve chamber for engagement with the valve seat, and further includes an actuator step projecting axially from the head through the annular cap member to be operated by an animal. Spring means disposed in the valve chamber urge the closure head into sealing relation with the valve seat. At least two spring fingers project from the valve body base, generally parallel with the interior boss and on opposite sides thereof, these fingers having confronting means for engaging the cylindrical sides of the pipe to maintain the valve body in fixed relation thereto. The interior boss is configured to extend into the pipe through a hole in the pipe wall having a diameter slightly larger than the boss diameter. An annular sealing means is provided for sealing between the valve body base and the pipe. The fingers of the waterer are adapted to maintain the valve body in coupled relation with the pipe, with the sealing means providing effective sealing between the pipe and the valve body.

More particularly these objects are accomplished in such animal waterer which includes a diverging annular wall formed integrally with the valve body and extending axially in the direction of the exterior boss, the diverging wall defining a waterer cup with the actuator stem extending axially into the cup. Also these objects are accomplished more particularly in such animal waterer wherein the exterior face of the valve body base is configured to define a bayonet-type locking means for securing thereto selectively a cup member, and a cup member provided with a flat base having a central opening, and configured to define a bayonet-type locking means for coacting locking engagement with the bayonet-type locking means of the valve body, thereby selectively converting a nipple waterer to a cup waterer.

The novel features and the advantages of the invention, as well as additional objects thereof, will be understood more fully from the following description when read in connection with the accompanying drawings.

DRAWINGS

DESCRIPTION OF THE PREFERRED EMBODIMENTS

Embodiment of FIGS. 1 through 4

Figure 1:
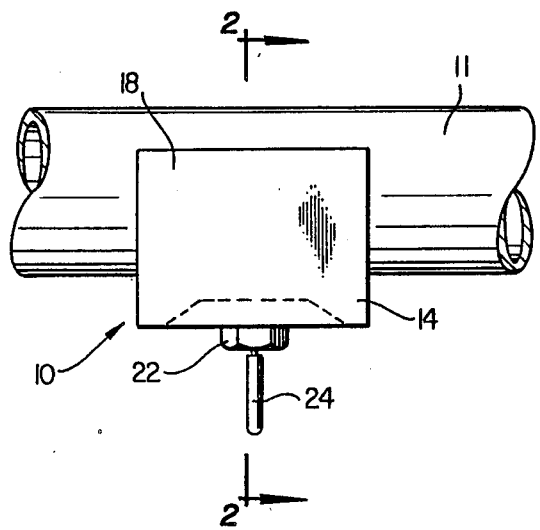
FIG. 1 is a side view of a nipple waterer according to the invention.

FIGS. 1 through 4 of the drawing illustrate a nipple waterer 10 according to the invention, so called because an actuator stem or nipple projects from the waterer body, to be engaged by an animal to effect water flow from the waterer. As illustrated in these figures, the nipple waterer is usually mounted on a water pipe in a manner that the nipple projects either directly downward or generally downward to enable the animals to place their mouths or beaks over the nipple when actuating it, to allow the water to flow along the nipple and into the mouth.

Nipple waterers of this type may be mounted at selectively spaced intervals along a length of water pipe, such as PVC pipe 11.

Figure 2:
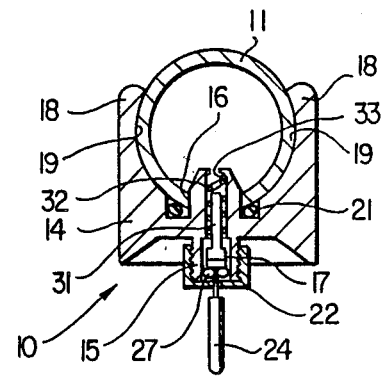
FIG. 2 is a transverse sectional view of the nipple waterer, taken along the line 2—2 of FIG. 1.
Figure 3:
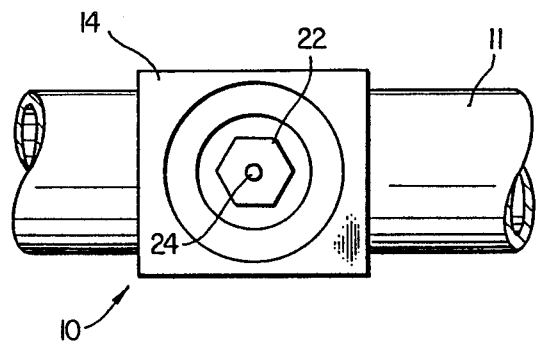
FIG. 3 is a bottom view of the nipple waterer of FIG. 1.
Figure 4:
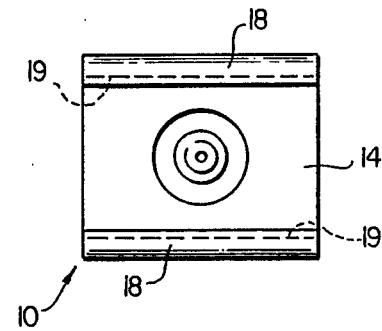
FIG. 4 is a top view of the nipple waterer of FIG. 1, apart from the pipe.

As best seen in FIG. 2, the nipple waterer 10 consists of a body including a base 14, an exterior boss 15 which projects from the base in one direction and an interior boss 16 which projects from the base in the opposite direction. These bosses are aligned axially; and a common axial bore 17 extends through the bosses and the intervening base to define a valve chamber. A pair of spring fingers 18 project transversely from the longer edges of said base in a direction generally parallel to the interior boss 16 and generally parallel to each other. These fingers have a depth sufficient to extend well past the center line of the pipe 11, when the waterer base 14 is seated on a pipe 11; and the fingers have a length or breadth which is the same as the length of the waterer body. The inner confronting faces of the fingers 18 are provided with cylindrical recesses 19 having the same diameter as the outer diameter of the pipe 11, with the distal ends of the fingers being reentrant so that the fingers will firmly engage the walls of the pipe 11 and firmly retain the waterer on the pipe.

For the mounting of the nipple waterer 10 on the pipe 11, the pipe is provided with a radial hole having a diameter slightly larger than that of the interior boss 16; and the boss 16 has sufficient depth to extend into that hoe. The interior face of the base 14 is provided with an annular recess immediately surrounding the interior boss 16 for the purpose of receiving a sealing ring 21. This sealing ring may have the form of an O-ring or any other suitable configuration, and is dimensioned so that when the waterer 10 is seated on the pipe 11 as illustrated in FIG. 2, the sealing ring 21 will provide a watertight seal between the pipe 11 and the waterer body 14.

The exterior boss 15 is externally threaded; and an internally threaded cap 22 is threadedly secured to the exterior boss. This cap is provided with an axial hole in its outer surface, smaller than the diameter of the valve chamber 17, and defines a valve seat for a valve closure member 24. The valve closure member 24 consists of a headed stem, the head of which is disposed within the valve chamber and has a diameter approaching that of the valve chamber, and the elongated stem or nipple of which projects centrally from the head and extends through the hole in the cap 22. The nipple is generally uniform in cross section, but may have a reduced diameter portion adjacent to the head to allow for greater lateral movement of the nipple relative to the cap 22. An O-ring seal member 27 may be provided on the nipple adjacent to the head to provide a resilient seal member between the head and the valve seat.

The valve closure member 24 is maintained in the illustrated seated relation by a valve control member 31 consisting of a headed stem, with the headed end bearing against the head of the valve closure member. A helical compression spring 32 is confined within the valve chamber 17 between the headed end of the valve control member and an internal lip 33 formed at the distal end of the interior boss 16. This spring generally surrounds the valve control member, and maintains the valve control member in axial alignment with the valve chamber 17.

In the use configuration illustrated in FIGS. 1 and 2, the valve of the nipple waterer 10 is opened typically by a lateral movement of the nipple effected by the animal seeking to obtain water. This movement rocks the closure member head relative to the valve seat to open the valve. Alternatively, the valve may be opened by direct upward axial force on the nipple. As soon as any activating force is removed, the spring 32 will return the valve closure member to the illustrated seated condition.

The nipple waterer, consisting of the base, exterior and interior bosses, and spring fingers is preferably fabricated from a moldable plastic material and is fabricated as a unitary member. The plastic material may be polyvinylchloride or polypropylene for example. The valve closure member 24 and the valve control member 31 are preferably fabricated from a suitable metal such as brass; and the spring 32 is preferably fabricated from a suitable spring wire.

Embodiment of FIGS. 5 through 8

FIGS. 5 through 8 of the drawing illustrate a cup waterer 40 according to the invention, so called because an actuator stem or nipple projects from the waterer body into a cup which is either integral with or attached to that body. As illustrated in these figures, the cup waterer is mounted on a water pipe in a manner that the cup extends upward, and the nipple extends vertically upward from the base of the cup. When an animal seeks to drink water from the cup, the nipple is engaged and displaced laterally allowing water to flow into the cup. The operation of the nipple by the animal, then, maintains the desired water level within the cup.

Cup waterers of this type may be mounted at selectively spaced intervals along a length of water pipe, such as PVC pipe 41.

Figure 6:
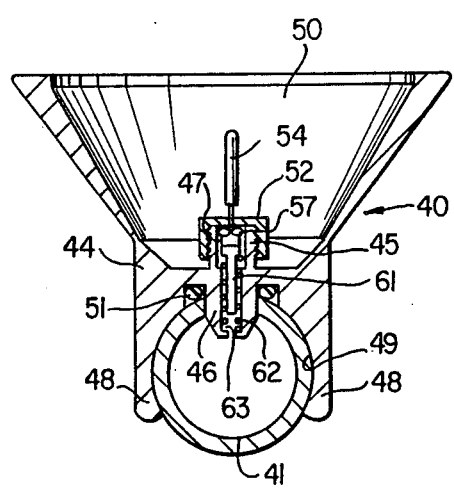
FIG. 6 is a transverse sectional view of the cup waterer, taken along the line 6—6 of FIG. 5.

As best seen in FIG. 6, the cup waterer 40 consists of a body including a base 44, an exterior boss 45 which projects from the base in one direction and an interior boss 46 which projects from the base in the opposite direction. These bosses are aligned axially; and a common axial bore 47 extends through the bosses and the intervening base to define a valve chamber. A pair of spring fingers 48 project transversely from the longer edges of the base in a direction generally parallel to the interior boss 46 and generally parallel to each other. These fingers have a depth sufficient to extend well past the center line of the pipe 41, when the waterer base 44 is seated on the pipe 41; and the fingers have a length or breadth which is the same as the length of the waterer body. The inner confronting faces of the fingers 48 are provided with cylindrical recesses 49 having the same diameter as the outer diameter of the pipe 41, with the distal ends of the fingers being reentrant so that the fingers will firmly engage the walls of the pipe 41 and firmly retain the waterer 40 on the pipe.

A hollow, frusto-conical cup member 50 is formed integrally with the nipple waterer base 44 extending upwardly and outwardly therefrom and surrounding the exterior boss 45. An annular recess, formed in the exterior face of the base 44 surrounding the exterior boss 45, coacts with the cup member 50 to define the cup chamber.

For the mounting of the nipple waterer 40 on the pipe 41, the pipe is provided with a radial hole having a diameter slightly larger than that of the interior boss 46., and the boss 46 has sufficient depth to extend into that hole. The interior face of the base 44 is provided with an annular recess immediately surrounding the interior boss 46 for the purpose of receiving a sealing ring 51. This sealing ring may have the form of an O-ring or any other suitable configuration, and is dimensioned so that when the waterer 40 is seated on the pipe 41 as illustrated in FIG. 6, the sealing ring 51 will provide a water-tight seal between the pipe 41 and the base 44.

The exterior boss 45 is externally threaded; and an internally threaded cap 52 is threadedly secured to the exterior boss. This cap is provided with an axial hole in its outer surface, smaller than the diameter of the valve chamber 47, and defines a valve seat for a valve closure member 54. The valve closure member 54 consists of a headed stem, the head of which is disposed with the valve chamber and has a diameter approaching that of the valve chamber, and the elongated stem or nipple of which projects centrally from the head and extends through the hole in the cap 52. The stem portion or nipple 54 of the valve closure member is generally uniform in cross section, but may have a reduced diameter portion adjacent to the head to allow for greater lateral movement of the nipple relative to the cap 52. An O-ring seal member 57 may be provided on the nipple adjacent to the head to provide a resilient seal member between the head and the valve seat. As best seen in FIG. 6, the nipple 54 extends well up into the chamber of the cup member 50 to facilitate the lateral actuation of the nipple by an animal seeking water. With the frusto-conical interior shape of the cup member, an animal seeking water will likely not engage the nipple if the water level is high. On the other hand the lower the water level, the more likely the animal will engage the nipple to reestablish the desired water level within the cup chamber.

Figure 5:
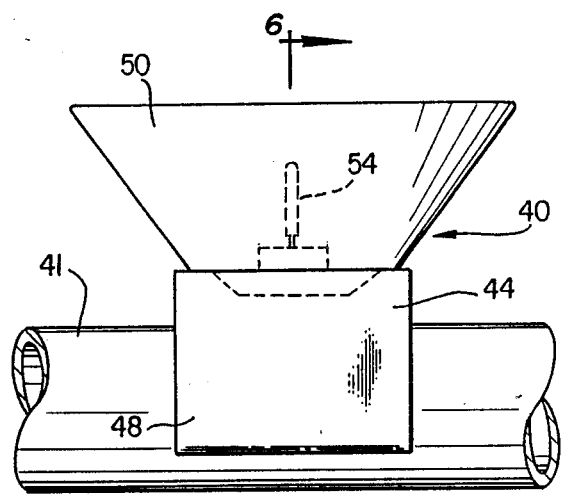
FIG. 5 is a side view of a cup waterer according to the invention.
Figure 8:
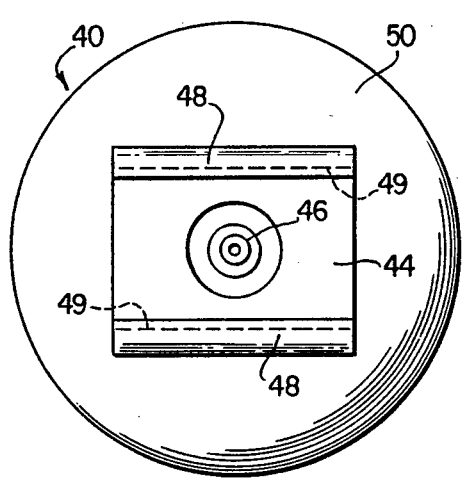
FIG. 8 is a bottom view of the cup waterer of FIG. 5.
Figure 7:
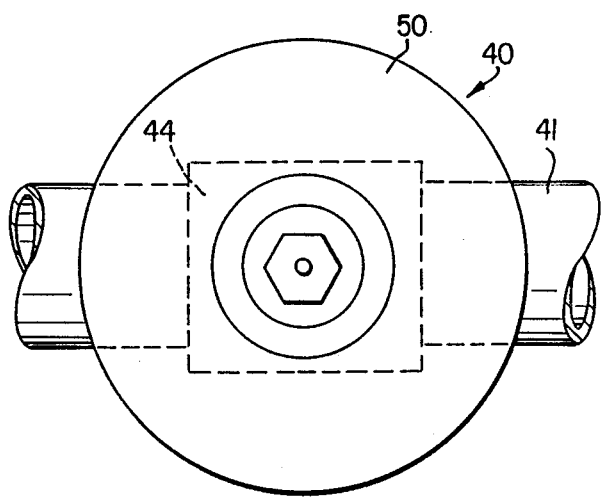
FIG. 7 is a top view of the cup waterer of FIG. 5.

The valve closure member 54 is maintained in the illustrated seating relation by a valve control member 61 consisting of a headed stem, with the headed end bearing against the head of the valve closure member. A helical compression spring 62 is confined within the valve chamber 47 between the headed end of the valve control member and an internal lip 63 formed at the distal end of the interior boss 46. This spring generally surrounds the valve control member, and maintains the valve control member in axial alignment with the valve chamber 47.

in the use configuration illustrated in FIGS. 5 and 6, the valve of the cup waterer 40 is opened typically by lateral movement of the nipple 54 effected by an animal seeking to drink water from the cup 50. This movement rocks the closure member head relative to the valve seat to open the valve. As soon as the activating force is removed, the spring 62 will return the valve closure member to the illustrated seated condition.

The cup waterer, consisting of the base, exterior and interior bosses, spring fingers, and cup member is preferably fabricated from a moldable plastic material and is fabricated as a unitary member. The plastic material may be polyvinylchloride or polypropylene for example. The valve closure member 54 and the valve control member 61 are preferably fabricated from a suitable metal such as brass; and the spring 62 is preferably fabricated from a suitable spring wire.

Embodiment of FIGS. 9 through 14

Figure 9:
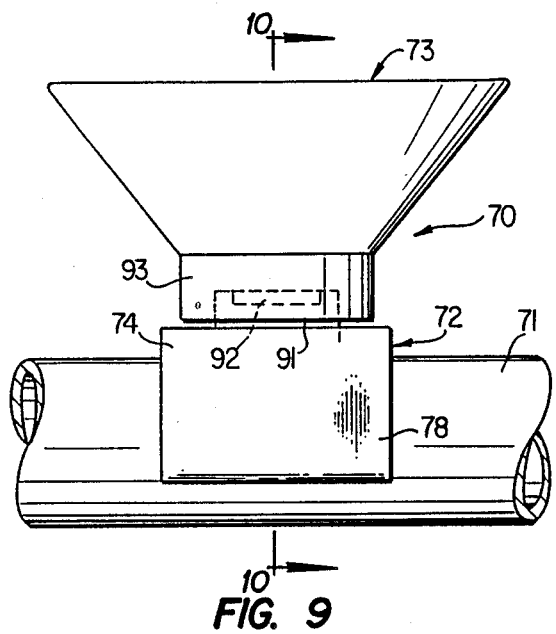
FIG. 9 is a side view of a convertible waterer according to the invention, configured as a cup waterer.
Figure 10:
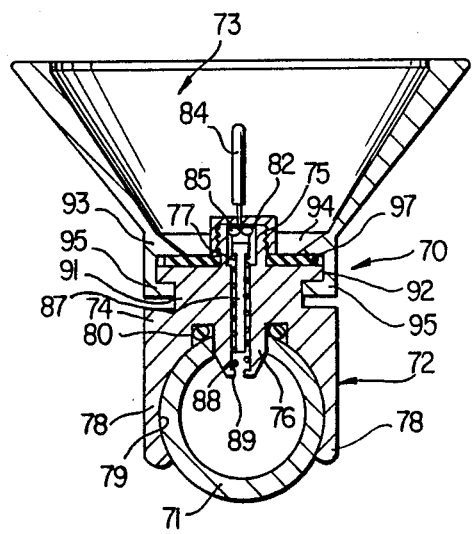
FIG. 10 is a transverse sectional view of the convertible waterer, taken along the line 10—10 of FIG. 9.
Figure 11:
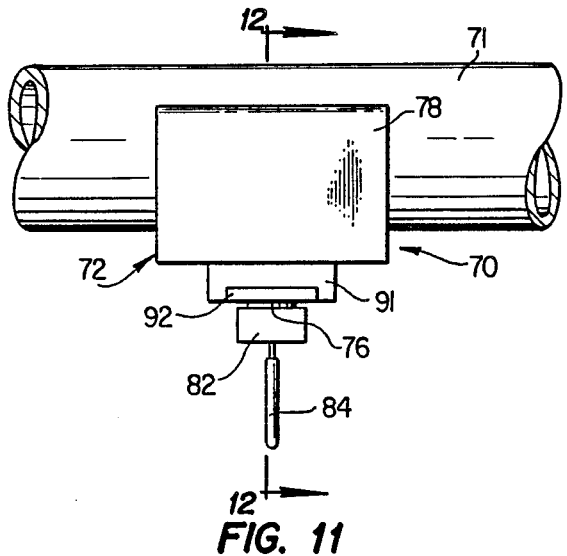
FIG. 11 is a side view of the convertible waterer of FIG. 9, configured as a nipple waterer.
Figure 12:
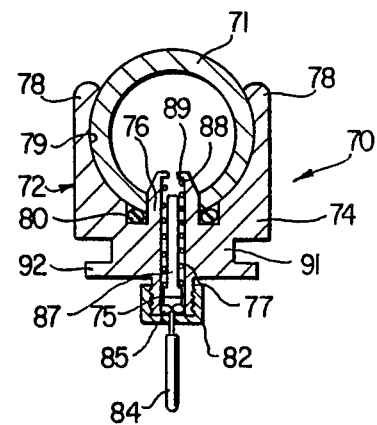
FIG. 12 is a transverse sectional view of the nipple waterer of FIG. 11, taken along the line 12—12 of FIG. 11.

FIGS. 9 through 14 of the drawing illustrate a convertible waterer 70 according to the invention, so called because it can be used as a nipple waterer wherein the actuator stem or nipple projects downward from the waterer body to be actuated by an animal to effect water flow, or as a cup waterer wherein the actuator stem or nipple projects upwardly from the body into a cup member which may be selectively mounted on the waterer body. FIGS. 11 and 12 illustrate the nipple waterer configuration wherein the downwardly projecting nipple enables animals to place their mouths or beaks over the nipple when actuating it, to allow the water to flow along the nipple and into the mouth or beak. FIGS. 9 and 10 illustrate the cup waterer configuration wherein an animal seeking water from the cup will actuate the nipple to replenish the water supply in the cup.

Convertible waterers of this type may be mounted at selectively spaced intervals along a length of water pipe, such as PVC pipe 71.

As best seen in FIG. 12, the nipple waterer 72 consists of a body including a base 74, an exterior boss 75 which projects from the base in one direction and an interior boss 76 which projects from the base in the opposite direction. These bosses are aligned axially; and a common axial bore 77 extends through the bosses into the intervening base to define a valve chamber. A pair of spring fingers 78 project transversely from the longer edges of the base in a direction generally parallel to the interior boss 76 and generally parallel to each other. These fingers have a depth sufficient to extend well past the center line of the pipe 71, when the waterer base 74 is seated on the pipe 71; and the fingers have a length or breadth which is the same as the length of the waterer body. The inner confronting faces of the fingers 78 are provided with cylindrical recesses 79 having the same diameter as the outer diameter of the pipe 71, with the distal ends of the fingers being reentrant so that the fingers will firmly engage the walls of the pipe 71 and firmly retain the waterer on the pipe.

For mounting of the nipple waterer 72 on the pipe 71, the pipe is provided with a radial hole having a diameter slightly larger than that of the interior boss 76; and the boss 76 has a sufficient depth to extend into that hole. The interior face of the base 74 is provided with an annular recess immediately surrounding the interior boss 76 for the purpose of receiving a sealing ring 80. This sealing ring may have the form of an O-ring or any other suitable configuration, and is dimensioned so that when the waterer 72 is seated on the pipe 71 as illustrated in FIG. 12, the sealing ring 80 will provide a watertight seal between the pipe 71 and the waterer body 74.

The exterior boss 75 is externally threaded; and an internally threaded cap 82 is threadedly secured to the exterior boss. This cap is provided with an axial hole in its outer surface, smaller than the diameter of the valve chamber 77, and defines a valve seat for a valve closure member 84. The valve closure member 84 consists of a headed stem, the head of which is disposed within the valve chamber and has a diameter approaching that of the valve chamber, and the elongated stem or nipple of which projects centrally from the head and extends through the hole in the cap 82. The nipple is generally uniform in cross section, but may have a reduced diameter portion adjacent to the head to allow for greater lateral movement of the nipple relative to the cap 82. An O-ring seal member 85 may be provided on the nipple adjacent to the head to provide a resilient seal member between the head and the valve seat. The valve closure member 24 is maintained in the illustrated seated relation by a valve control member 87 consisting of a headed stem, with the headed end bearing against the head of the valve closure member. A helical compression spring 88 is confined within the valve chamber -77 between the headed end of the valve control member and an internal lip 89 formed at the distal end of the interior boss 76. This spring generally surrounds the valve control member 87, and maintains the valve control member in axial alignment with the valve chamber 77.

In this nipple waterer configuration illustrated in FIGS. 11 and 12, the valve of the nipple waterer 72 is opened typically by lateral movement of the nipple effected by the animal seeking to obtain water. This movement rocks the closure member head against the valve seat to open the valve. Alternatively, the valve may be opened by direct upward axial force on the nipple. As soon as any activating force is removed the spring 88 will return the valve closure member to the illustrated seated condition.

Figure 13:
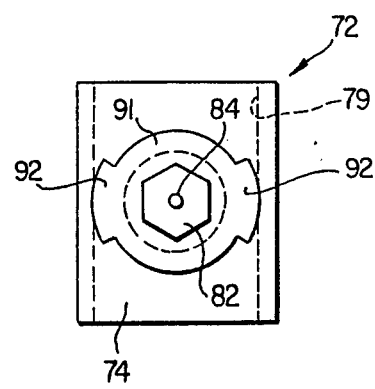
FIG. 13 is a bottom view of the valve body portion only of the nipple waterer of FIGS. 11 and 12.

This nipple waterer 72 differs from the nipple waterer of FIGS. 1 through 4 in that the exterior face of the base 74 is formed to provide a reduced diameter locking boss 91 having locking lugs 92 projecting laterally from the distal end of that boss at opposite sides thereof. The above mentioned external boss 75 projects centrally from the locking boss portion of the base 74. FIG. 13 is a bottom view of the nipple waterer 72, apart from the pipe 71, providing an end view of the locking boss 91 and locking lugs 92.

In the cup waterer configuration of the convertible waterer 70, illustrated in FIGS. 9 and 10, the nipple waterer 72 has been inverted on the pipe 71 to define a valve body, on the base 74 of which a frusto-conical shaped cup member 73 has been mounted. The cup member 73 has a generally cylindrical base 92 and frusto-conical walls projecting upwardly and outwardly from that base to define the cup chamber. The base 93 has an internal annular sealing lip 94, approximately at the point of the juncture of the base 93 and the cup walls, to effect the seal with the valve body 72 as will be described. At the distal end of the cup base 93, opposed locking lugs 95 project inwardly from opposite sides of the cup base. These locking lugs 95 coact with the locking lugs 92 of the locking boss 91 to provide an interlocking lug, bayonet-type lock for securing the cup member 73 to the nipple waterer 72, in the joint relation of the nipple waterer and cup member, a resilient annular sealing washer 97 is interposed between the cup member sealing lip 94 and the locking boss 91. This sealing washer is resilient and possibly quite compressible to provide effective sealing between these members and also to provide a biasing force to maintain the locking lugs 92 and 95 in locking engagement. Desirably, these locking lugs may have suitable means, such as coacting detents, to maintain the nipple waterer and cup member in the desired locked rotational relation.

Figure 14:
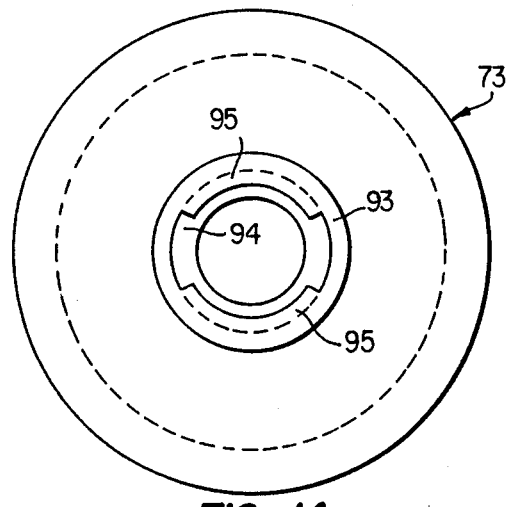
FIG. 14 is a bottom view of the cup portion only of the convertible waterer of FIG. 9.

To convert the nipple waterer 72 to a cup waterer, the resilient sealing washer 97 is placed in the cup member base; and the locking lugs of the cup member are interlocked with the locking lugs of the nipple waterer, and the cup member rotated approximately 90° in one direction to effect the assembly. For release of the cup member, it is simply rotated approximately 90° in the reverse direction and removed. FIG. 14 is a bottom view of the cup member 73, apart from the nipple waterer 72.

In the use configuration as a cup waterer, illustrated in FIGS. 9 and 10, the valve of the waterer is opened typically by lateral movement of the nipple 84 effected by an animal seeking to drink water from the cup 73. This movement rocks the closure member head member relative to the valve seat to open the valve. As soon as the activating force is removed, the spring 88 will return the valve closure member to the illustrated seated condition.

The nipple waterer, consisting of the base, exterior and interior bosses and spring fingers, and the cup member, are preferably fabricated from a moldable plastic material. The plastic material may be polyvinylchloride or polypropyline for example. The valve closure member 84 and the valve control member 87 are preferably fabricated from a suitable metal such as brass; and the spring 88 is preferably fabricated from a suitable spring wire.

What has been described are several forms of animal waterers, suitable for use as a nipple waterer, a cup waterer, or both.

A principal feature and advantage of the invention is that these waterers are designed to be assembled with a suitable water pipe in snap-on relation; and the only preparation necessary for assembly is the drilling of radial holes in the pipe at suitable spaced intervals. A related advantage of the invention is that, should one of these waterers require replacement, the entire waterer may be simply snapped off from the pipe and replaced with a new unit.

An ancillary feature and advantage of the invention is that the major parts of the waterers are fabricated from a suitable moldable plastic material, thereby minimizing the fabrication costs of the waterers.

Another related advantage of the invention is that the labor costs in connection with the installation of a waterer system is minimized, because the waterers may be simply snapped onto the pipes which have been provided with suitable holes; and the maintenance costs are similarly minimized by the snap-on installation and removal feature.

Another feature and advantage of the invention is that waterers may be configured either as a nipple waterer or as a cup waterer, and incorporate the snap-on installation and replacement feature.

A further feature and advantage of the invention is that the waterer may be configured as a convertible waterer, usable in basic form as a nipple waterer, the basic form being configured to be assembled with a cup member to produce a cup waterer configuration, in this way a large user of waterers, who employs the waterers in both nipple waterer systems and cup waterer systems, may reduce his inventory by stocking only a single basic nipple waterer with cup attachment rather than two completely separate forms of nipple waterer and cup waterer.

While the preferred embodiments of the invention have been illustrated and described, it will be understood by those skilled in the art that changes and modifications may be resorted to without departing from the spirit and scope of the invention.

What is claimed is:

1. An animal waterer for mounting on a cylindrical pipe comprising
   a valve body including a base, and interior and exterior aligned bosses projecting from said base in opposite directions;
   said valve body having a bore extending axially through said bosses and base, defining a valve chamber;
   an annular cap member secured to said exterior boss at its distal end; said cap member defining a valve seat;
   a valve closure member, including an enlarged closure head disposed in said valve chamber for engagement with said valve seat, and including an actuator stem projecting axially from said head through said annular cap member to be operated by animals;
   spring means disposed in said valve chamber, urging said closure head into sealing relation with said valve seat;
   at least two spring fingers projecting integrally from said valve body base, in generally parallel relation with said interior boss and on opposite sides thereof; said fingers having confronting means for engaging the cylindrical sides of said pipe to maintain said valve body in a fixed spring grip relation to said pipe;
   said interior boss being configured to extend into said pipe, through a hole in the pipe wall having a diameter slightly larger than the diameter of said boss; annular sealing means for sealing between said valve body base and said pipe; and said fingers being adapted to maintain said valve body in coupled relation with said pipe, with said sealing means providing effecting sealing between said pipe and said valve body.

2. An animal waterer as set forth in claim 1 including said interior boss having interior lip means at its distal end projecting into said bore; said lip means retaining said spring-means for urging said valve closure member into said sealing relation.

3. An animal waterer as set forth in claim 1 including said exterior boss being externally threaded at its distal end; said cap member being internally threaded for threaded mounting on said exterior boss.

4. An animal waterer as set forth in claim 1 including said valve body being fabricated from a molded plastic material.

5. An animal waterer as set forth in claim 1 including said valve body having an interior facing annular recess surrounding said interior boss;
   an annular sealing washer disposed in said recess, defining said sealing means.

6. An animal waterer as set forth in claim 1 including a diverging annular wall formed integrally with said valve body and extending axially therefrom in the direction of said exterior boss; said annular diverging wall defining a waterer cup;
   said actuator stem extending axially in said cup, to be operated by the animals to effect selective flow of water into said cup.

7. An animal waterer as set forth in claim 5 including said valve body being fabricated from a molded plastic material.

8. An animal waterer as set forth in claim 1 including the exterior face of said valve body base being configured to define a bayonet-type locking means for securing selectively a cup member thereto.

9. An animal waterer as set forth in claim 8 including a cup member comprising a base having a central opening, and an annular diverging wall extending from said flat base;
   said flat base being configured to define bayonet-type locking means for coacting locking engagement with said bayonet-type locking means of said valve body;
   said cup member being securable to said valve body by means of said coacting bayonet-type locking means, with said actuator stem extending axially into said cup member to be operated by animals to effect selective flow of water into said cup member.

10. An animal waterer as set forth in claim 9 including an annular sealing- member disposed between said valve body base and said cup member base to provide a watertight seal therebetween.

11. An animal waterer as set forth in claim 8 including said valve body and said cup member being fabricated from a molded plastic material.

* * * * *